US010790738B1

(12) United States Patent
Mhiesan et al.

(10) Patent No.: US 10,790,738 B1
(45) Date of Patent: Sep. 29, 2020

(54) CIRCUIT AND METHOD FOR FAULT DETECTION AND RECONFIGURATION IN CASCADED H-BRIDGE MULTILEVEL CONVERTERS

(71) Applicants: Haider Mhiesan, Fayetteville, AR (US); Roy A. McCann, Fayetteville, AR (US); H. Alan Mantooth, Fayetteville, AR (US)

(72) Inventors: Haider Mhiesan, Fayetteville, AR (US); Roy A. McCann, Fayetteville, AR (US); H. Alan Mantooth, Fayetteville, AR (US)

( * ) Notice: Subject to any disclaimer, the term of this patent is extended or adjusted under 35 U.S.C. 154(b) by 0 days.

(21) Appl. No.: 16/420,539

(22) Filed: May 23, 2019

Related U.S. Application Data

(60) Provisional application No. 62/677,270, filed on May 29, 2018.

(51) Int. Cl.
*H02M 1/32* (2007.01)
*H02M 7/5387* (2007.01)
*H02M 7/483* (2007.01)

(52) U.S. Cl.
CPC ............ *H02M 1/32* (2013.01); *H02M 7/483* (2013.01); *H02M 7/53871* (2013.01); *H02M 2001/325* (2013.01); *H02M 2007/4835* (2013.01)

(58) Field of Classification Search
CPC ... H02M 2007/4835; H02M 2001/325; H02M 1/32; H02H 7/1225
See application file for complete search history.

(56) References Cited

U.S. PATENT DOCUMENTS

| | | | | |
|---|---|---|---|---|
| 7,568,931 | B2 | 8/2009 | Hammond | 439/263 |
| 8,441,147 | B2 | 5/2013 | Hammond | 307/29 |
| 9,425,705 | B2 | 8/2016 | Zargari et al. | |
| 9,515,574 | B2 | 12/2016 | Zhang et al. | |
| 9,537,421 | B2 | 1/2017 | Zhang et al. | |
| 9,812,990 | B1 | 11/2017 | Cheng et al. | |
| 2008/0079314 | A1 | 4/2008 | Hammond | 307/43 |
| 2008/0174182 | A1 | 7/2008 | Hammond | 307/85 |
| 2009/0073622 | A1 | 3/2009 | Hammond | 361/67 |
| 2012/0068555 | A1* | 3/2012 | Aiello | H02M 7/483 307/115 |
| 2013/0121042 | A1* | 5/2013 | Gan | H02M 7/49 363/37 |

(Continued)

OTHER PUBLICATIONS

M. M. Haji-Esmaeili, M. Naseri, H. Khoun-Jahan and M. Abapour, "Fault-tolerant structure for cascaded H-bridge multilevel inverter and reliability evaluation," in IET Power Electronics, vol. 10, No. 1, pp. 59-70, Jan. 20, 2017.

(Continued)

*Primary Examiner* — Harry R Behm
(74) *Attorney, Agent, or Firm* — Keisling & Pieper PLC; David B. Pieper

(57) ABSTRACT

A faulted switch isolated replacement path for a power converter is provided using replacement switches connected to an isolated node. The replacement switches can be controlled by normal operating signals. The replacement path is isolated by isolation switches during normal operation. During a fault condition, the isolating switches are activated such that the isolated node is selectively connected to the appropriate power output.

6 Claims, 14 Drawing Sheets

(56) References Cited

U.S. PATENT DOCUMENTS

| | | | | |
|---|---|---|---|---|
| 2014/0268928 | A1 | 9/2014 | Wei et al. | 363/37 |
| 2016/0301322 | A1* | 10/2016 | Choi | H02M 5/458 |

OTHER PUBLICATIONS

P. Moamaei, H. Mahmoudi and R. Ahmadi, "Fault-tolerant operation of cascaded H-Bridge inverters using one redundant cell," 2015 IEEE Power and Energy Conference at Illinois (PECI), Champaign, IL, 2015, pp. 1-5.

M. Aleenejad, H. Iman-Eini and S. Farhangi, "Modified space vector modulation for fault-tolerant operation of multilevel cascaded H-bridge inverters," in IET Power Electronics, vol. 6, No. 4, pp. 742-751, Apr. 2013.

W. Song and A. Q. Huang, "Fault-Tolerant Design and Control Strategy for Cascaded H-Bridge Multilevel Converter-Based STATCOM," in IEEE Transacations on Industrial Electronics, vol. 57, No. 8, pp. 2700-2708, Aug. 2010.

* cited by examiner (a)

(b)

(a)

(b)

CIRCUIT AND METHOD FOR FAULT DETECTION AND RECONFIGURATION IN CASCADED H-BRIDGE MULTILEVEL CONVERTERS

CROSS-REFERENCE TO RELATED APPLICATIONS

This application claims priority of U.S. Patent Application Ser. No. 62/677,270 filed by Mhiesan et al. on May 29, 2018 entitled NOVEL CIRCUIT AND METHOD FOR FAULT DETECTION AND RECONFIGURATION IN CASCADED H-BRIDGE MULTILEVEL CONVERTERS which is hereby incorporated by reference in its entirety.

STATEMENT REGARDING FEDERALLY SPONSORED RESEARCH OR DEVELOPMENT

This invention was made with government support under cooperative agreement 1439700 awarded by National Science Foundation Engineering Research Center for Grid-connected Advanced Power Electronic Systems (GRAPES). The government has certain rights in the invention.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in power converter circuits. More particularly, the invention relates to improvements particularly suited for fault conditions in power converters by providing a fault compensating circuit. In particular, the present invention relates specifically to a power converter with a controlled fault parallel path.

2. Description of the Known Art

As will be appreciated by those skilled in the art, power converters are known in various forms. Patents disclosing information relevant to power converters: U.S. Pat. No. 9,537,421, issued to Zhang, et al. on Jan. 3, 2017 entitled Multilevel converter; and U.S. Pat. No. 9,515,574, issued to Zhang, et al. on Dec. 6, 2016 entitled Modular embedded multi-level converter with midpoint balancing. Each of these patents is hereby expressly incorporated by reference in their entirety.

U.S. Pat. No. 9,537,421 has an abstract that reads: A power converter includes at least one leg having a first string operatively coupled to a second string via a first connecting node and a second connecting node. The first string includes a first branch and a second branch operatively coupled via a third connecting node. Each of the branches has a plurality of switching units, a controllable semiconductor switch and the first connecting node and the second connecting node. The first string is operatively coupled across a first bus and a second bus. Furthermore, the second string includes a plurality of controllable semiconductor switches.

U.S. Pat. No. 9,515,574 has an abstract that reads: A modular embedded multi-level converter (MEMC) includes a first phase portion and a second phase portion. The first phase portion includes a first switch stack operable to couple a first phase branch between a positive DC bus and a midpoint node. The second phase portion includes a second switch stack operable to couple a second phase branch between the midpoint node and a negative DC bus. A DC voltage between the positive DC bus and the negative DC bus is distributable among switching units disposed in the first phase branch and the second phase branch. A distribution of the DC voltage is controlled by regulating a DC voltage at the midpoint node to balance energy among the switching units.

Other references of note include:

Zargari, N., Xiao, Y. and Wei, L., Method and apparatus for bypassing cascaded H-Bridge (CHB) power cells and power sub cell for multilevel inverter. U.S. Pat. No. 9,425,705B2, 2012.

M. M. Haji-Esmaeili, M. Naseri, H. Khoun-Jahan and M. Abapour, "Fault-tolerant structure for cascaded H-bridge multilevel inverter and reliability evaluation," in IET Power Electronics, vol. 10, no. 1, pp. 59-70, Jan. 20, 2017.

Peter Willard Hammond, "Device and system for bypassing a power cell of a power supply", U.S. Pat. No. 8,441,147B2, 2014.

Peter Willard Hammond, "Method for operating a multi-cell power supply having an integrated power cell bypass assembly", UUS20080174182A1, 2006.

Lixiang Wei, Yuan Xiao, Haihui Lu, Douglas B. Weber, ", Power cell bypass method and apparatus for multilevel inverter", US20140268928A1, 2013.

Peter Willard Hammond, "System for bypassing a power cell of a power supply", US20080079314A1, 2006.

Peter Willard Hammond, Method and system for bypassing a power cell of a power supply, US20090073622A1, 2007

Peter Willard Hammond, Integrated power cell bypass assembly and power supply including same, U.S. Pat. No. 7,568,931B2, 2006.

P. Moamaei, H. Mahmoudi and R. Ahmadi, "Fault-tolerant operation of cascaded H-Bridge inverters using one redundant cell," 2015 IEEE Power and Energy Conference at Illinois (PECI), Champaign, Ill., 2015, pp. 1-5.

M. Aleenejad, H. Iman-Eini and S. Farhangi, "Modified space vector modulation for fault-tolerant operation of multilevel cascaded H-bridge inverters," in IET Power Electronics, vol. 6, no. 4, pp. 742-751, April 2013.

W. Song and A. Q. Huang, "Fault-Tolerant Design and Control Strategy for Cascaded H-Bridge Multilevel Converter-Based STATCOM," in IEEE Transactions on Industrial Electronics, vol. 57, no. 8, pp. 2700-2708, August 2010.

Zhongyuan Cheng, Navid Reza Zargari "Spare on demand power cells for modular multilevel power converter", U.S. Pat. No. 9,812,990B1, 2016.

Still further items of note include the facts that solar photovoltaics and wind turbine generators achieved 10% of US electricity generation in March 2017 (https://www.eia-.gov/todayinenergy/detail.php?id=31632). This percentage is expected to increase in future years. The electricity generated from wind and solar sources requires power electronic circuits in order to make this energy available to the electric utility grid. Consequently, there is a need for improved fault detection and isolation in power electronic converters in order to maximize the reliability of renewable energy sources. In addition, there will be power electronics needed for utility-scale battery storage systems in order to provide back-up energy for times of reduced wind and solar capacity and to provide black-start capability for restoration after power outages.

There are several types of Modular Multi-Level Converters, MMCs, presently in use. Examples include the flying capacitor, neutral point clamped aka NPC, and cascaded H-bridge aka CHB, modular multilevel converter topologies and circuits. The modular multilevel converters are suitable in high and medium-voltage applications because of their good performance to handle higher voltage than the other kind of power converters. The MMCs applications include high-voltage direct current, HVDC, power system applications, STATCOM, FACTS, battery energy storage systems, etc. An example of an MMCs application is the CHB multilevel inverter which is the most suitable for battery energy storage systems in medium voltage distribution system applications.

The CHB topology allows the use of power electronic devices such as insulated gate bipolar transistors (IGBTs) and metal oxide semiconductor field effect transistors (MOSFETs) in medium voltage applications. Individual IGBT and MOSFET ratings may be on the order of 5 kV or less. In the multilevel topology, the devices are placed in series or "stacked" in a manner such that with controlled switching methods can achieve operating voltages much higher than the individual components.

The modular building block of an H-bridge inverter consists of four switches which are turned ON (conducting) or OFF (blocking) in a manner to control the input voltage. FIG. 1 shows the circuit of CHB inverter module. The output from the CHB inverter is the same the input voltage if switches "Position 2" and "Position 3" are turned ON. While the output voltage is the opposite polarity of the input voltage if "Position 1" and "Position 4" are ON. The output voltage is zero if switches in "Position 1" and "Position 3" have the same status, they are turned ON or OFF. Also, when the switches in "Position 2" and "Position 4" are turned ON or OFF at the same time, the output voltage is equal to zero. The CHB principle is shown in FIG. 3.

The CHB topology consists of a number of H-bridge modules connected in series as shown in FIG. 3(*a*). The H-bridge inverter is referred to as a "module" or "cell" when it used in a CHB inverter. When connected in series, the cells are controlled such that the output voltage of CHB Vum is the sum of the output voltage of each cell The CHB topology Vu. The output voltage from each cell and the CHB is in FIG. 3(*b*). Vu1 is the output voltage of the cell number one, and it is equal to +Vdc, 0, or −Vdc. The rest of the cells have the same principle where their output voltages are +Vdc, 0, or −Vdc. Using the excite Pulse Width Modulation (PWM), the pattern of each cell voltage can be controlled in such way that the output voltage of the CHB is formed in alternated current (ac) form.

Since MMC topologies have a large number of switches, there is always the possibility of switching faults. As the number of cells increase, the probability of a faulty switch also increases. This leads to concerns about reliability for safety and critical infrastructure applications being supplied through renewable energy resources.

There are two kinds of device faults that could happen in power electronics applications: short- and open-circuit faults. Short-circuits can be caused by over-load, over-voltage, overheating, and many other causes. Methods to detect short-circuit faults have been provided with hardware circuitry. These circuits are integrated with commercial gate drivers to shut down the devices within a very short time when faults are detected.

Open-circuit device faults can be caused by gate driver faults, wire bond lift off, and cracking of solder layers. An open circuit switch fault in the MMC results in an unbalanced output voltage and current and produce unreliable systems. This may lead to an overall shutdown in the system being supplied by the converter and result in an expensive downtime situation for commercial and industrial loads.

There have been various methods proposed for fault detection and reconfiguration for MMCs in power electronic converters. In summary, prior art methods fall into one of two categories. The first is to detect and isolate a faulty cell. However, isolation of one cell results in lost functionality and degraded operation. The second category involves installing redundant back-up systems that significantly increase overall system cost.

One of the proposed solutions for MMC under fault conditions is to bypass a H-bridge cell. It could be done by adding four relays for each cell. If there is a fault, the relays disconnect the faulty cell and connect its batteries to a healthy cell. This solution cannot work for medium and high voltage applications for many reasons. First, adding batteries to another cell will damage the switches because the input voltage will be doubled. Generally, the semiconductor switches have a limited amount of voltage that can be exceeded. Second, in the case of battery energy storage and photovoltaics systems, it should have a controller for balancing the charging and discharging status. Adding a battery from a faulty cell to a healthy cell will affect the state of charge aka SOC and result in controller faults. If the controller is set for SOC with certain values, the controller may fail to balance the SOC for the inverter. This solution is also expensive because it uses high-voltage circuit breakers when compared against semiconductor switches. These circuit breakers should handle voltage levels equal to the sum of the all the batteries. Further, when a fault happens, the inverter voltage level changes. Most importantly, when a fault happens and the faulty cell is disconnected, there is a huge change in the output voltage and current ripples and total harmonic distortion aka THD. In any design, the output voltage ripple and THD can be reduced by designing a correct output filter. The output filter smooths the delivered voltage and current and therefore reduces the THD. A robust grid-tide-inverter should meet all the standard requirements such as, the ripple current should be less than 5%: the resonant frequency should be avoided; and the THD should be reduced. Bypassing methods have not included the issues related to filter design to meet the worst case criteria.

Another solution is to use a redundant cell. It may be either stand by batteries or could be an extra cell. These stand by batteries or the extra cell will be used after the fault occurrence. These methods have many issues. Using external batteries is too expensive for medium and high voltage applications. The stand by batteries or the extra cell have no function until the fault happens. In case the inverter has four legs, the cost of the batteries with an extra cell is increased by ¼ factor of the battery cost for one phase. Moreover, the methods cannot provide a solution if there is another fault at the same phase. Therefore, this method is designed to handle one fault per phase and it is not a robust solution. In addition, the SOC balancing controllers cannot balance the new batteries, which are added from the external cell or the extra batteries, with the old cells. Suppose a fault happens when the SOC is at 40%. When adding new batteries, the SOC for the new batteries is around 100%. In this case the controllers cannot balance the entire system.

Thus, the prior art methods have a higher cost of implementation through the use of redundant back-up circuits, or result in reduced power quality with only marginal improvements to reliability. Also, these methods cannot maintain the controller so that the system has continuity. In other words, when there is a fault, the excite methods either add redundant cells or remove the faulty cell, and that result in hard time for the controller to keep the same charging and discharging modes. In addition, prior art methods can apply just for a specific kind of MMCs, which is CHB.

From these prior references it may be seen that these prior art patents are very limited in their teaching and utilization, and an improved power converter is needed to overcome these limitations.

SUMMARY OF THE INVENTION

The present invention is directed to an improved power converter using a faulted element controlled parallel path. In accordance with one exemplary embodiment of the present invention, an isolated path that can be used for alternative faults is provided using a selectively isolated node and switches.

This invention discloses a new and novel power electronic circuit and method for isolating and reconfiguration faults in power electronic inverter-rectifiers. This invention provides a significant improvement compared to existing methods by: 1) detecting fault conditions more rapidly, 2) isolating a fault in a manner that reduces disruption of electricity delivery, and 3) minimizes the cost impact to the overall system.

This invention pertains to the development of a novel MMCs circuit that provides a new method to maintain system operation under the condition of one or more components suffering from a faulted condition. This results in a converter that continues to operate at full capability. This is particularly important in energy systems such as those that provide power for hospitals, airports, transportation and others safety critical infrastructure systems.

The present invention can be implemented for all varieties of MMCs including CHB and others.

Advantages of the present invention as a fault system for CHB multilevel inverter topology are:

Low implementation costs that insure there is no need to add expensive parts.

Simplicity where there is no need to change the system's controller. Simplicity can insure the system SOC and balancing do not have to change or add more controllers.

A reliable and robust system that operates under more than one fault while keeping the power quality for the system. If there are faults in all the cells, the proposed topology will ensure the system keeps working at the same voltage levels, having the same controller logic.

A robust system for some specific military and navy applications that ensure continuous operation under fault conditions.

Flexibility to work with low, medium, or high voltage applications.

This invention is a completely different topology that provides novel reconfiguration solutions for all MMCs that contain H-bridge modules.

This invention pertains to the development of a novel MMC circuit that provides a new method to maintain system operation under the condition of one (or more) components suffering from a faulted condition. The invention is summarized in FIG. 1 in the highlighted areas with components T1, T2, Sa1, Sb1, Sa2, Sb2, etc. As detailed in SECTION 1.5, these components are switched ON or OFF in response to voltage measurements that provide a systematic method for detecting and responding to an open/short fault condition on S11, S12, S13, S14, etc. This results in a converter that continues to operate at full capability. This is particularly important in energy systems such as those that provide power for hospitals, airports, transportation and other safety critical infrastructure systems.

In contrast, prior art methods have a higher cost of implementation through the use of redundant back-up circuits, or result in reduced power quality with only marginal improvements to reliability. Also, these methods cannot maintain the controller so that the system has continuity. In other words, when there is a fault, the excite methods either add redundant cells or remove the faulty cell, and that results in hard time for the controller to keep the same charging and discharging modes. In addition, prior art methods can only apply for a specific kind of MMC, which is CHB, while the proposed method can implement for all the kinds of MMCs. This invention is important to societal applications because Reliable systems to operate under more than one fault while keeping the same power quality for the systems. If there are faults in all the cells, the proposed topology will ensure the system continuously works at the same voltage levels, having the same controller logics. Also, it is a robust system for some specific military and navy applications that also ensure continuous operation in this environment under fault conditions. Therefore, this method may serve:

1. Automotive power electronics
2. Power system applications
3. Army-Navy applications
4. Power inverters
5. Applications in medium and high HVDC
6. Applications encountering large temperature swings
7. Applications requiring high power density
8. Power converters with n-level switches These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 2:
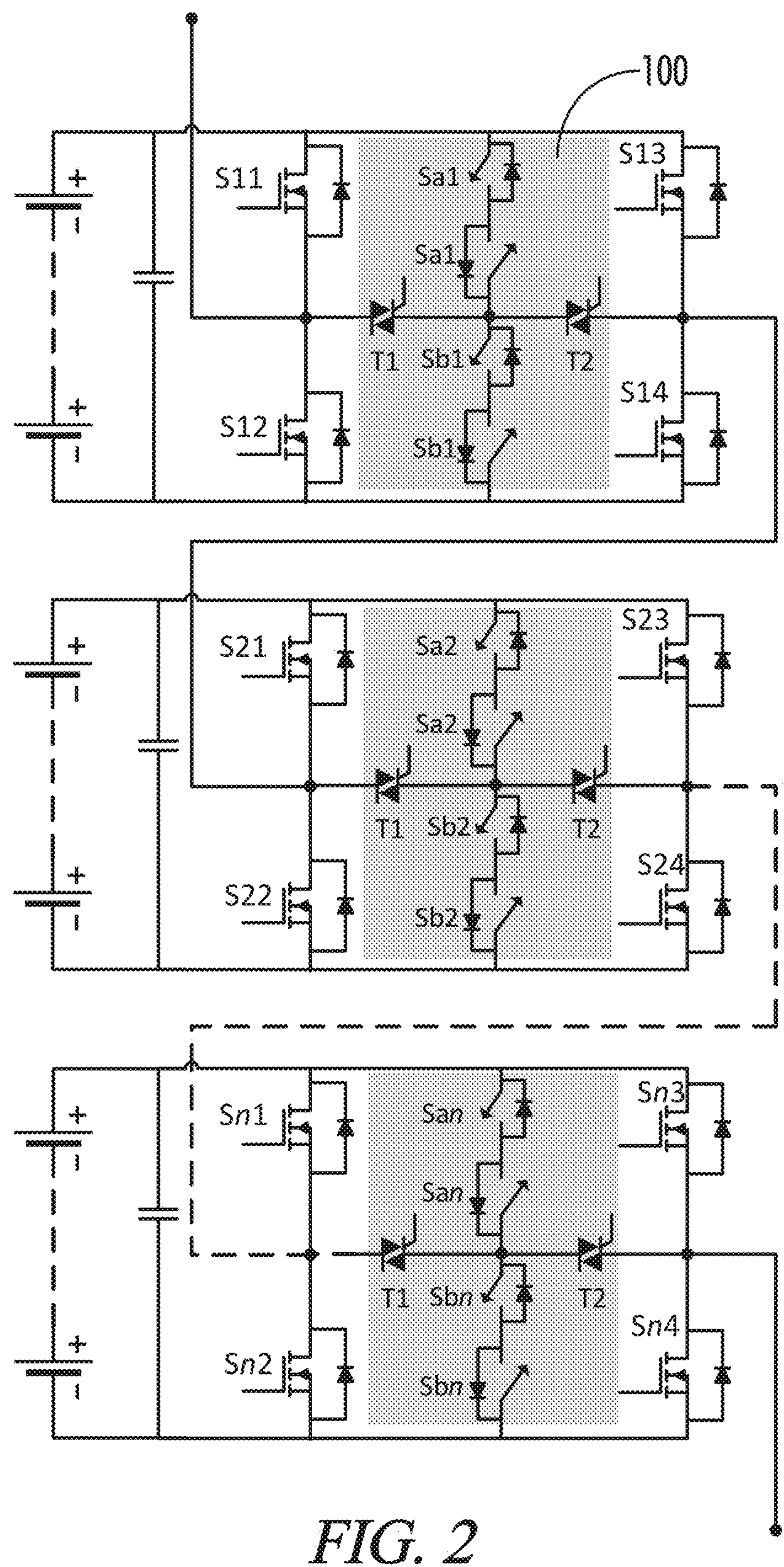
FIG. 2 is a schematic showing a novel reconfiguration Cascaded H-Bridge multilevel inverter circuit with opposite SiC MOSFETs.
Figure 3:
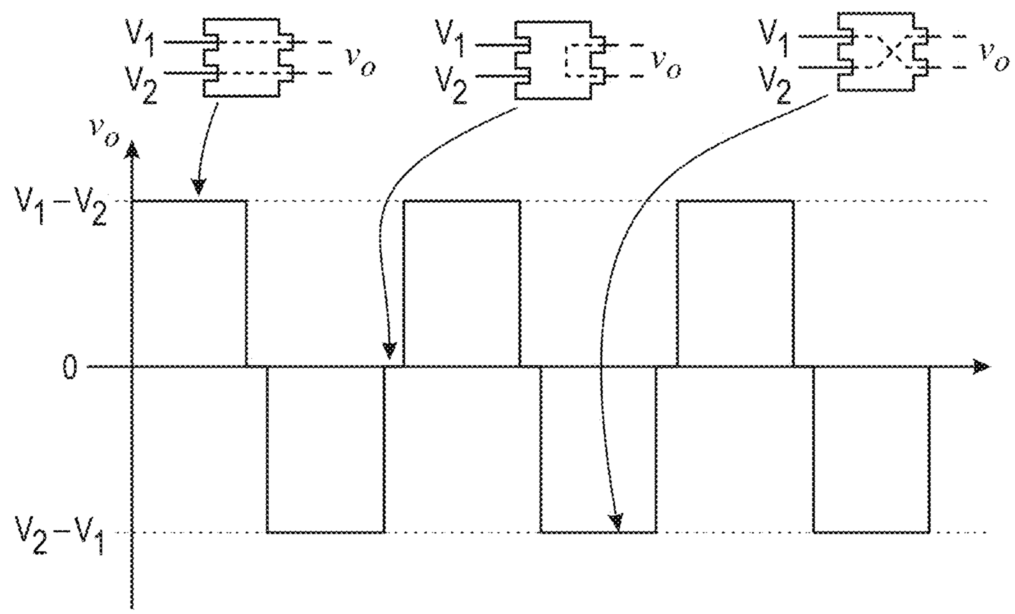
FIG. 3 shows an H-bridge inverter module operation principle.
Figure 4:
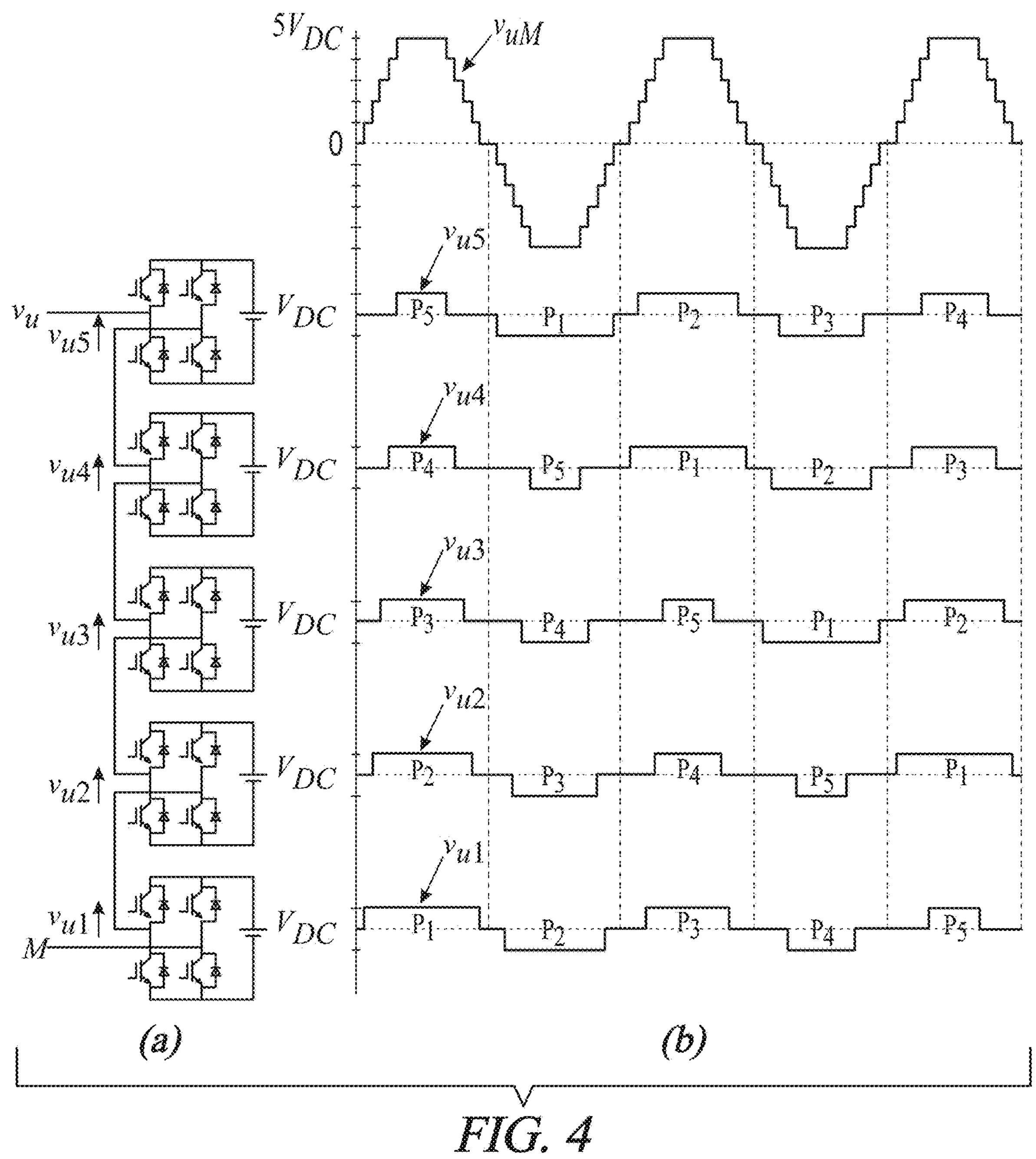
FIG. 4 shows (a) a Cascaded H-Bridge multilevel inverter (b) Output voltages of H-Bridge cells and CHB multilevel inverter.
Figure 5:
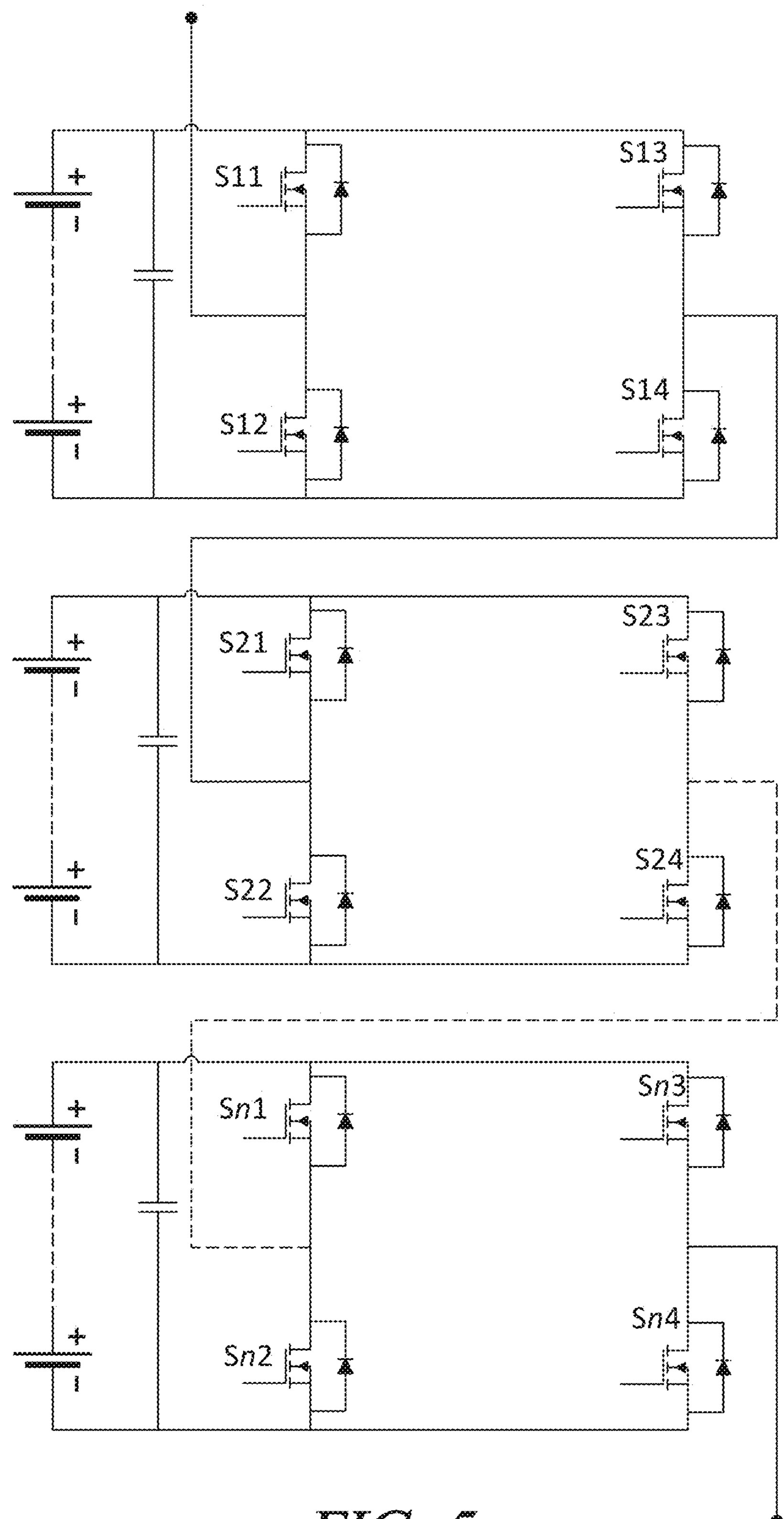
FIG. 5 shows a Cascaded H-Bridge multilevel inverter with open circuit fault at S11.
Figure 6:
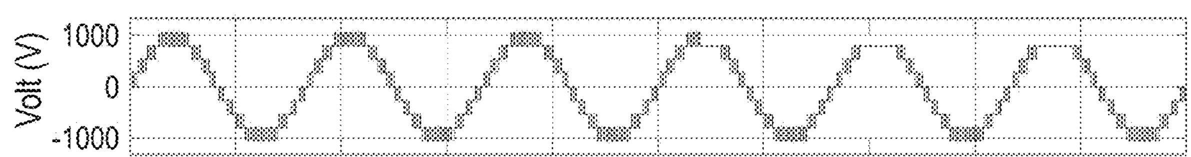
FIG. 6 shows an output voltage of a Cascaded H-Bridge multilevel inverter with open circuit fault at S11.

As shown in FIG. 2 of the drawings, one exemplary embodiment of the present invention is generally shown as an isolated fault replacement path H bridge 100. Because Cascaded H-Bridge, aka CHB, inverters have multiple stacked cascade cells with a large number of semiconductors, MOSFETs or IGBT, devices, there is a possibility of a fault condition occurring in one of these semiconductors switches. If there is an open circuit switch fault, the output voltage and current are less than the expected values. Since the faulty switch acts as a diode due to an internal antiparallel diode, the cell output voltage for the faulty switch does not produce the desired voltage. As an example, FIG. 5 shows a CHB with an open circuit fault at S11, and FIG. 6 shows the output voltage during a faulted switch condition. When one of the switches is faulted, the output voltage level will be reduced and results in: the output voltage and current being unbalanced; degraded power quality with voltage and current harmonics which leads to increased losses and lower efficiency; power outages and equipment downtime along with the associated economic and financial losses; and may also result in damaged loads such as computer networks and electric motors.

The CHB reconfiguration circuit adds four switches for each CHB cell as shown in FIG. 2 to form the isolated fault replacement path H bridge 100. The replacement path uses two path switches, Sa1, Sb2 connected to a replacement path output node that is isolated from the first output by a First isolating switch T1 and is also isolated from the second output by a second isolating switch T2, which may be TRIACs or contactors, that are normally open to isolate the isolated path output node. These isolating switches T1, T2 are activated using a control command when a fault condition is detected. The upper fault path switch San is reconfigured in the event there is a fault in one of the upper switches Sn1 or Sn3. For a fault in Sn2 or Sn4, lower fault path switch Sbn would be activated to compensate for this condition.

Figure 1:
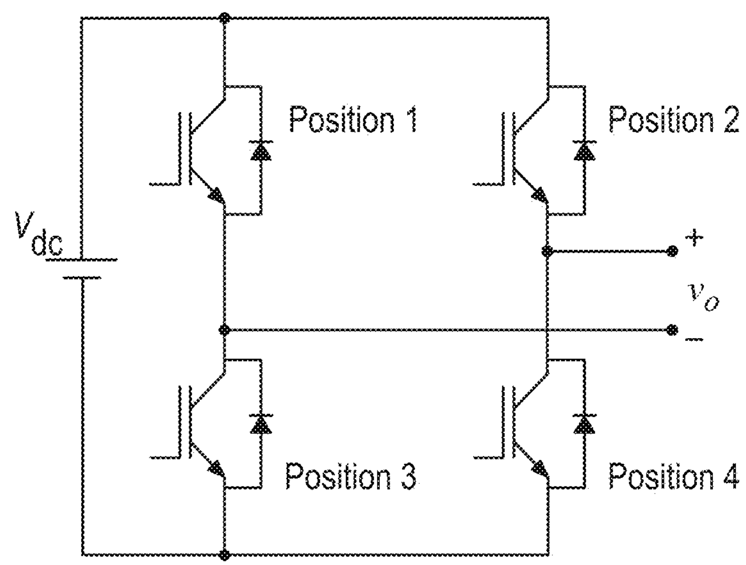
FIG. 1 is an H-bridge inverter module.

In FIG. 1, the reason why the upper fault path switch San consists of two opposite reconfigured switches is to ensure that there is no current path through the antiparallel diodes. The two opposite diodes of the reconfigured switches prevent the current flowing during the normal operation when there is no fault.

Figure 7:
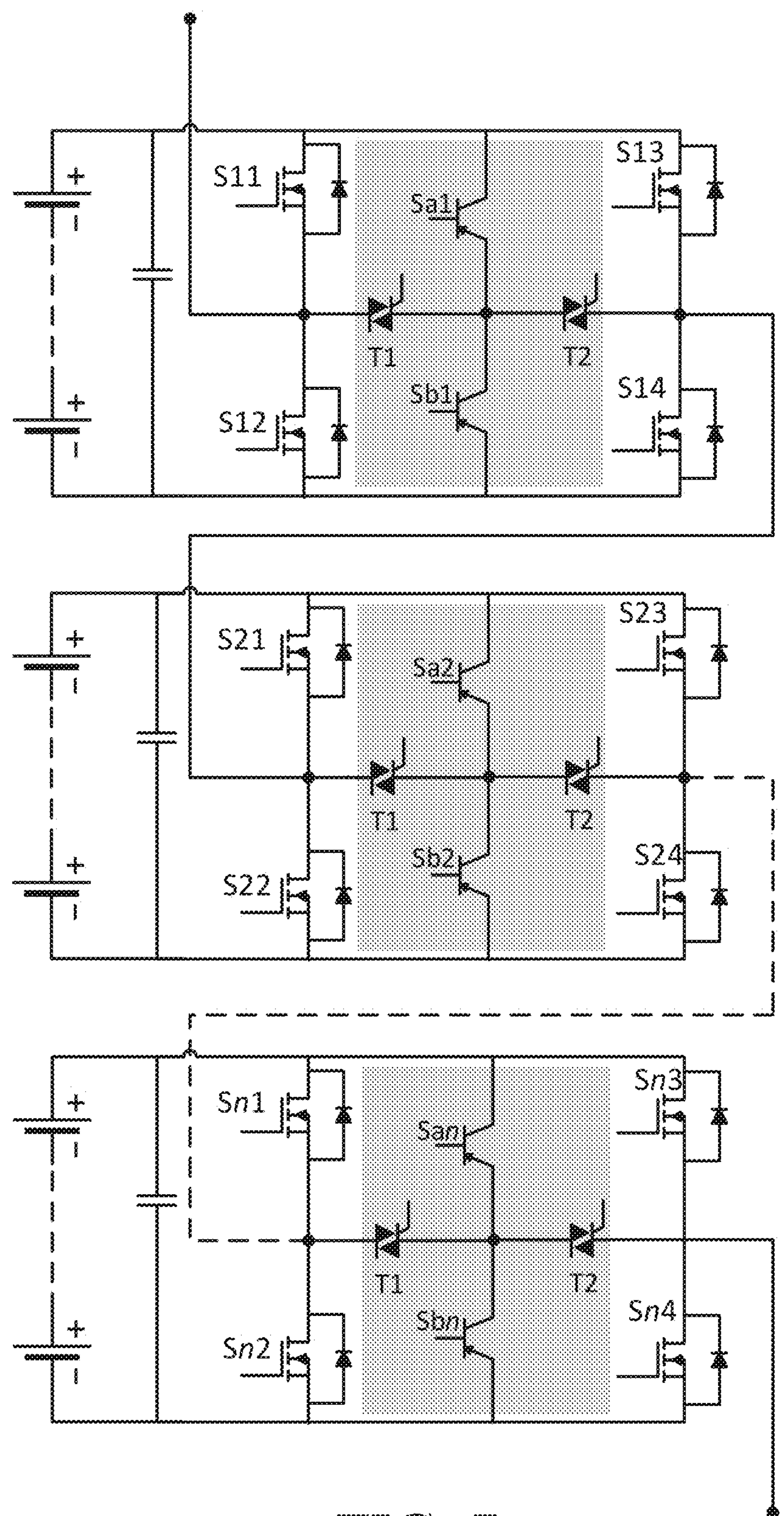
FIG. 7 is schematic showing a novel reconfiguration CHB multilevel inverter circuit with IGBTs.

Another reconfiguration topology for CHB multilevel inverter that can use IGBTs without using an antiparallel diode is as shown in FIG. 7. This reconfiguration circuit results in cost reduction by reducing the number of the reconfigured switches. Instead of using two opposite reconfigured switches to prevent the current from flowing during the normal operation, the reconfiguration can use just one reconfigured switch for the upper cell and another one for the lower cell for each H-Bridge module.

Figure 8:
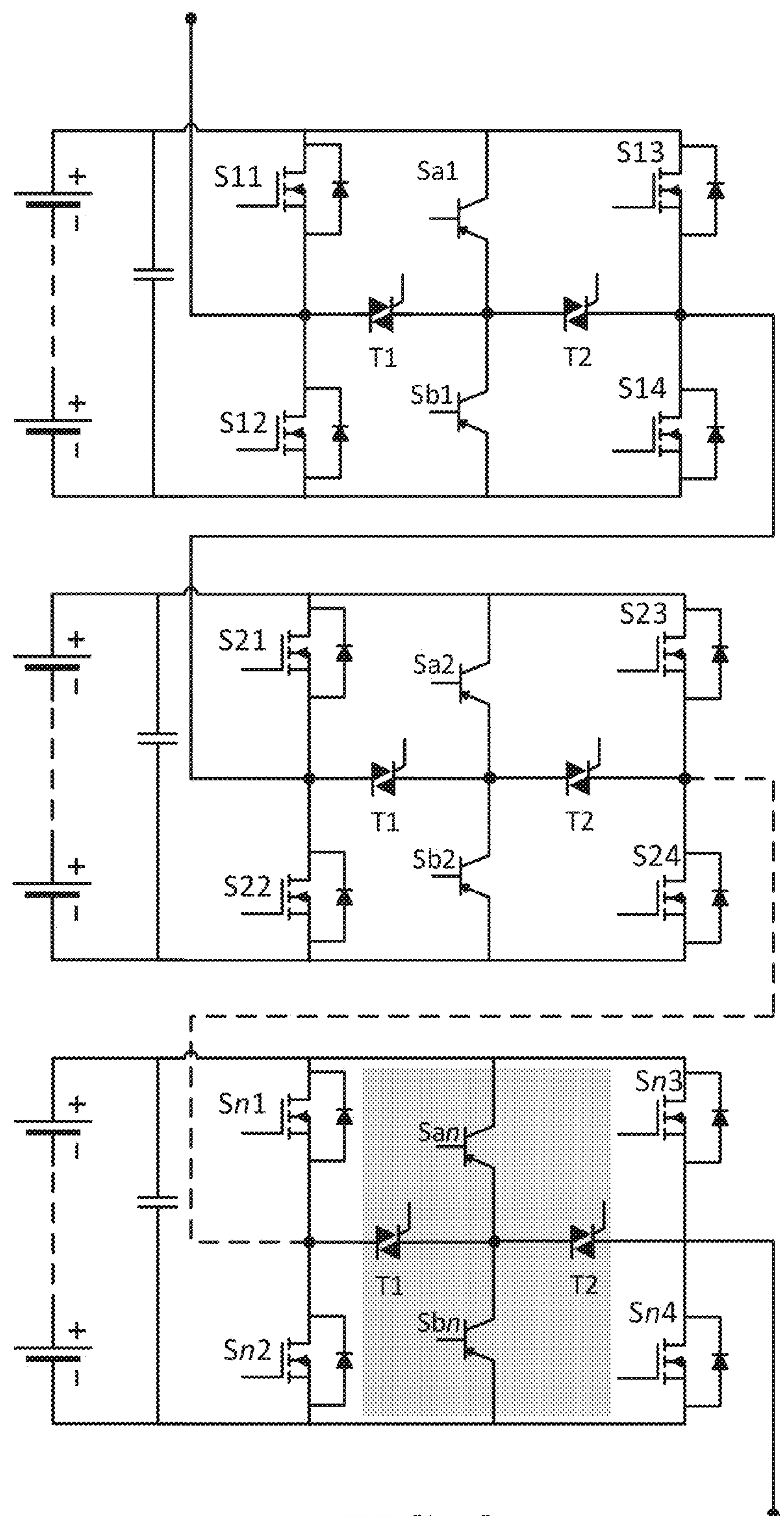
FIG. 8 is a schematic showing a novel reconfiguration CHB multilevel inverter circuit with IGBTs with open circuit faults at S11 and S24.

To further explain the operation of the method, suppose S11 has an open circuit fault as shown in FIG. 8. The output voltage changes to have less voltage level as shown in FIG. 6. There are two main commands that should take a place for the proposed circuit to compensate the lost voltage level. First T1 will be closed. Second, Sa1 will be turned ON and turned OFF as the same S11 PWM signals. This can be interpreted as S11 being replaced by Sa1. In other words, the PWM for Sa1 would be the same as S11 when a fault happens at S11.

Also, when another fault happens, the proposed reconfiguration CHB circuit can ensure that the system keeps working without any interruptions. As an example, suppose S24 has an open circuit fault as shown in FIG. 8. The reconfiguration controller sends commands for T2 in the second H-Bridge cell to be closed and Sb2 to have the same S24 PWM signals.

Therefore, this circuit can provide a solution if there is another fault at the same phase. Also, this circuit topology handles more than one fault per phase and it is a robust solution for multiple faults. In addition, there is no need for the SOC balancing controllers to change their functionality since there is no change in the SOC for each cell.

General Fault Detection

Figure 9:
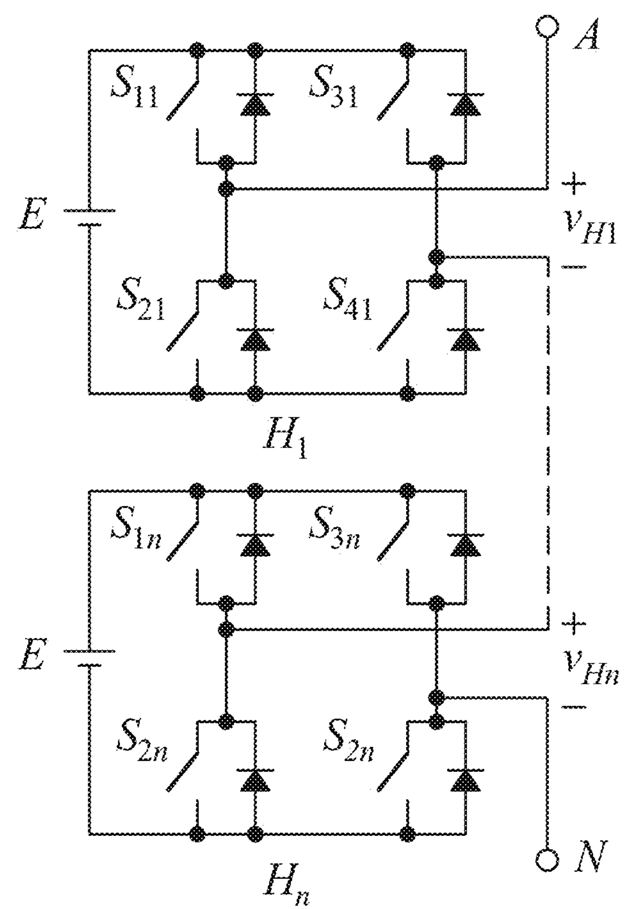
FIG. 9 shows a n-Level CHB Multilevel Inverter.

A single phase CHB multilevel inverter is shown in FIG. 9. Each CHB cell consists of a dc voltage source, E, and four switches. The number of the CHB cells is n. The output voltage of each CHB cell is $v_{H1}$ to $v_{Hn}$, and could be equal to −E, 0, or E. The output voltage of a single phase CHB multilevel inverter ($V_{AN}$) is the sum of $v_{H1}$ to $v_{Hn}$.

Figure 10:
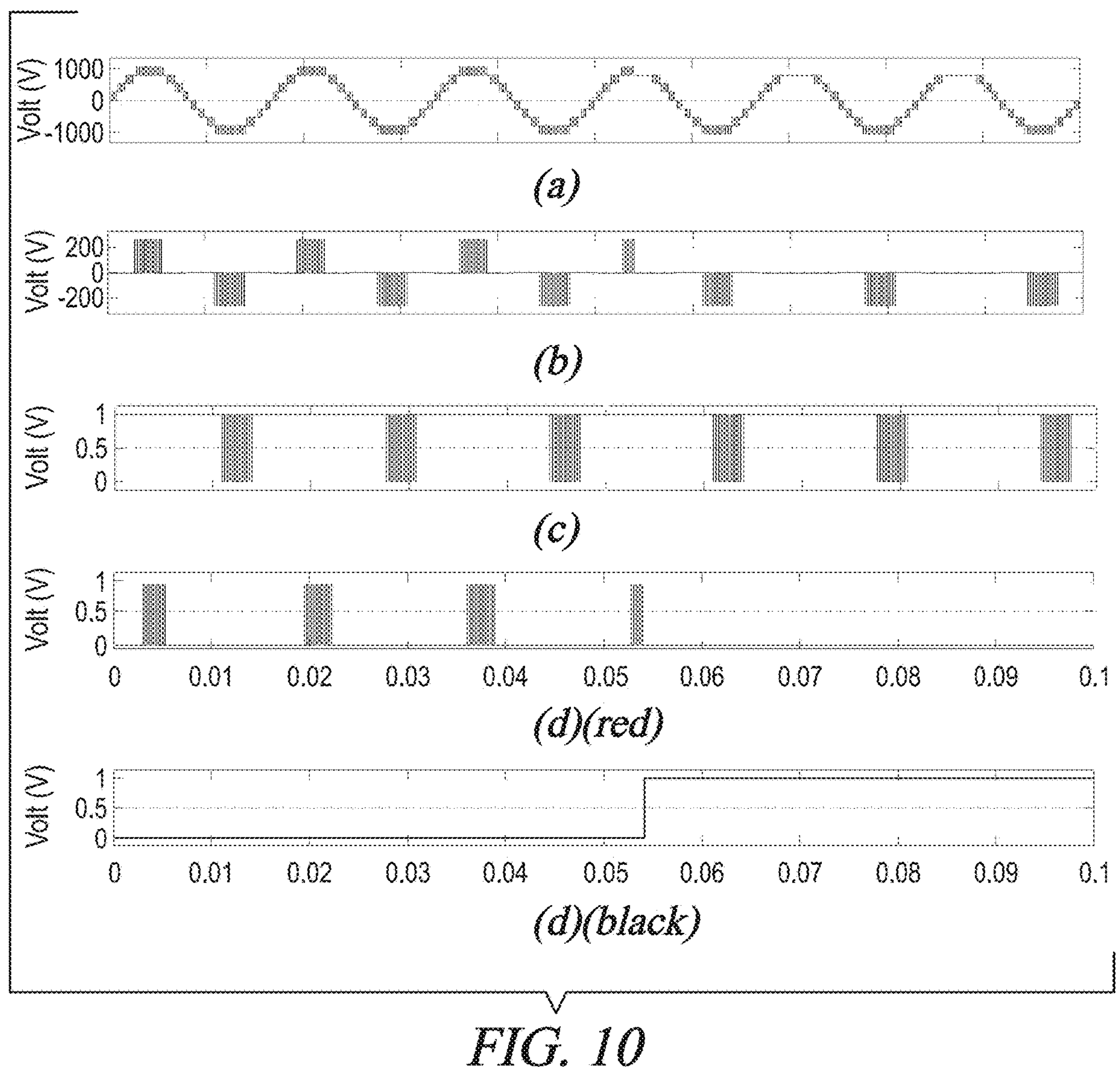
FIG. 10 shows results of an open circuit fault switch on $S_{11}$ at t=0.054 s, (a) the output voltage; (b) output voltage of H1; (c) PWM signal of $S_{41}$; and (d) $S_{11}$ (red) and the fault detection signal (black).

To verify the proposed open circuit fault method, a detailed MATLAB/Simulink model was developed to examine the performance of the proposed fault detection method. As a first example, an open circuit fault has been created for a nine-level CHB multilevel inverter. The results in FIG. 10 verify the fault condition. As shown in FIG. 10, the inverter is in normal operation and all the signals are as expected, $V_{AN}$ in FIG. 10(*a*), $v_{H1}$ in FIG. 10(*b*), and PWM for $S_{41}$ in FIG. 10(*c*), and PWM for $S_{11}$ (red) and the fault detection signal (black) in FIG. 10(*d*). However, as shown on FIG. 10(*d*), suddenly a gate misfiring fault occurs (PWM for $S_{11}$ becomes zero), which results in an open circuit fault at time=0.054 s. Thus, $v_{H1}$ becomes only either negative or zero, which verifies the identification method described in case 1 in the previous section. When the fault is detected, the controller sends a command to isolate the faulty cell.

Figure 11:
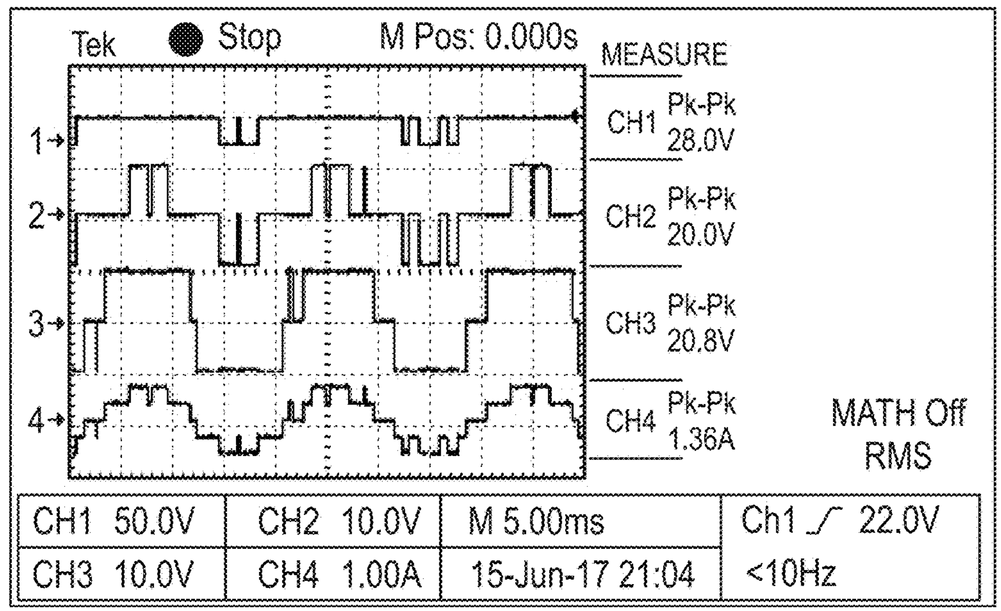
FIG. 11 shows the PWM signal of $S_{41}$ (ch1), $v_{H1}$ (ch2), $v_{H2}$ (ch3), and output current (ch4) under (a) Normal operation and (b) An open fault on $S_{11}$.
Figure 11:
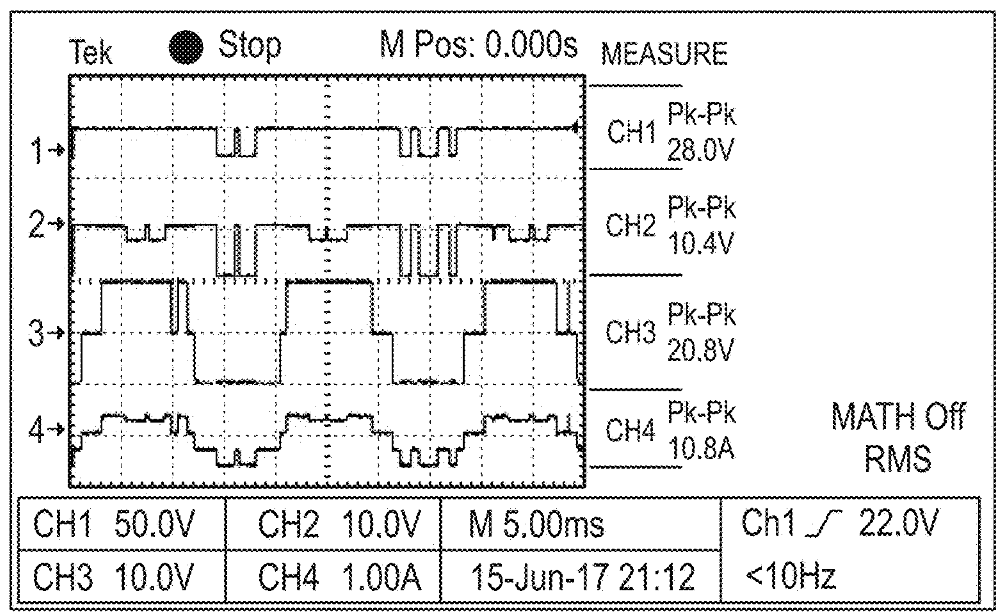
Figure 12:
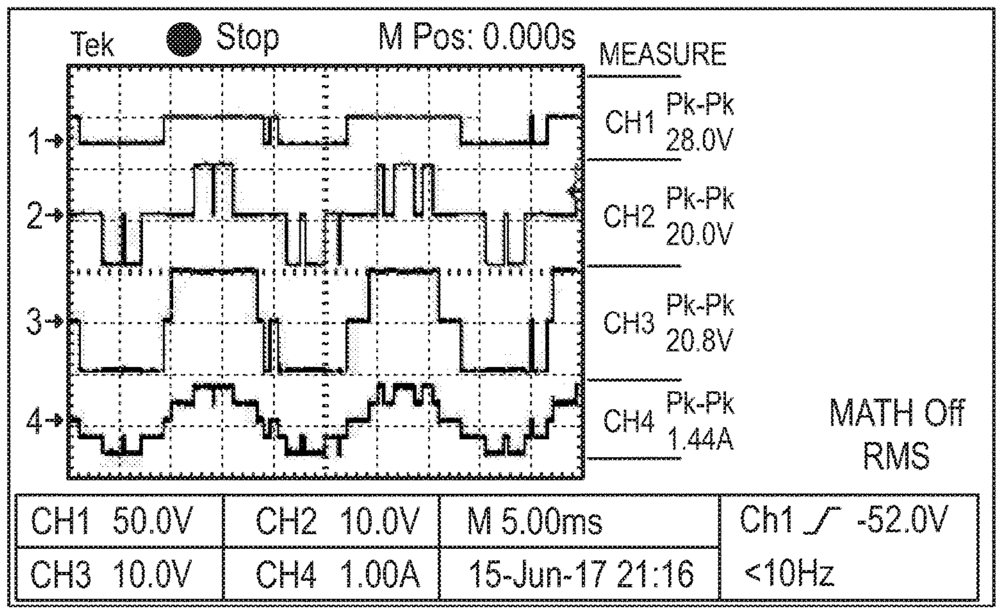
FIG. 12 shows the PWM signal of $S_{42}$ (ch1), $v_{H1}$ (ch2), $v_{H2}$ (ch3), and output current (ch4) under (a) Normal operation. (b) Fault on $S_{12}$.
Figure 12:
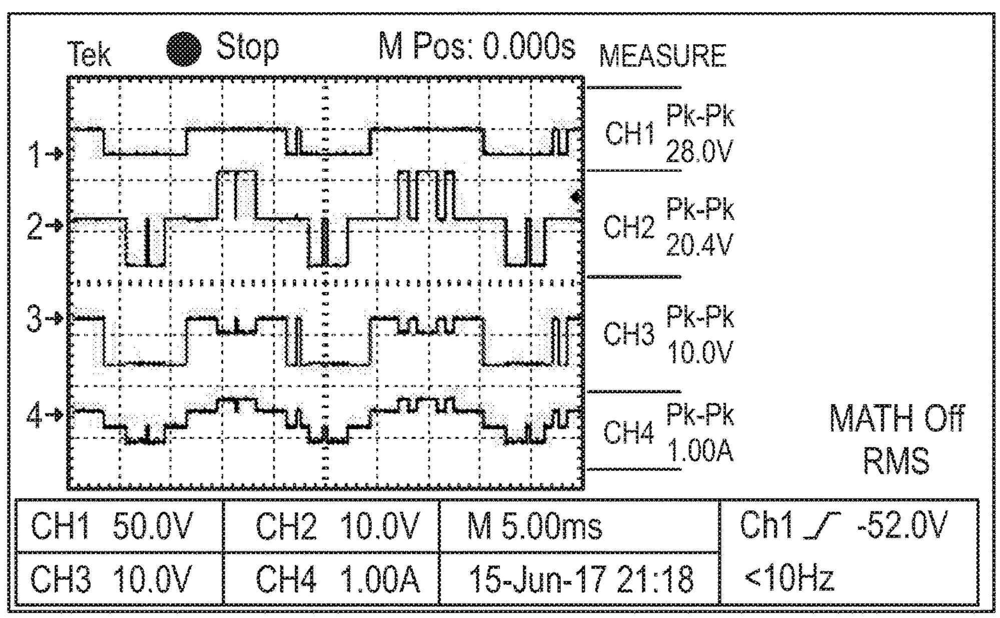

To provide a validation for the proposed method, and to ensure that the suggested algorithm for open circuit fault detection, a five-level CHB multilevel inverter, two H-bridge cells, has been built using SiC MOSFETs. Each H-bridge has a 10 V input. MicroAutoBox dSPACE has been used to generate the LS-PWM. The open circuit faults have been generated assuming gate misfiring faults. Results in FIGS. 11 and 12 show the PWM signals of $S_{14}$ and $S_{24}$, output voltages of cell 1 and cell 2 ($v_{H1}$ and $v_{H2}$), and the output current, respectively, under normal and fault operations. The experimental results show the validation of the proposed method where equation 1 and 2 can be applied, verifying case 1 (FIG. 11) and case 3 (FIG. 12). As the FIG. 10(*b*) shows case 1, $S_{41}$ in ON and i>0, and $v_{H1}\leq 0$, then faulty switch is $S_{11}$. In FIG. 12(*b*), t>0, and $v_{H2}\leq 0$, and $S_{42}$ is ON, then $S_{12}$ is located as faulty switch. Simulation and experimental results confirmed the relation between the current, CHB voltage cell, and the switching state. This method is shown to be: 1) Straightforward to implement due to its simple algorithm, 2) Provides for detection and location of the fault within one cycle, and 3) Can be implemented for an unlimited number of CHB cells.

Reconfiguration Topology

Figure 13:
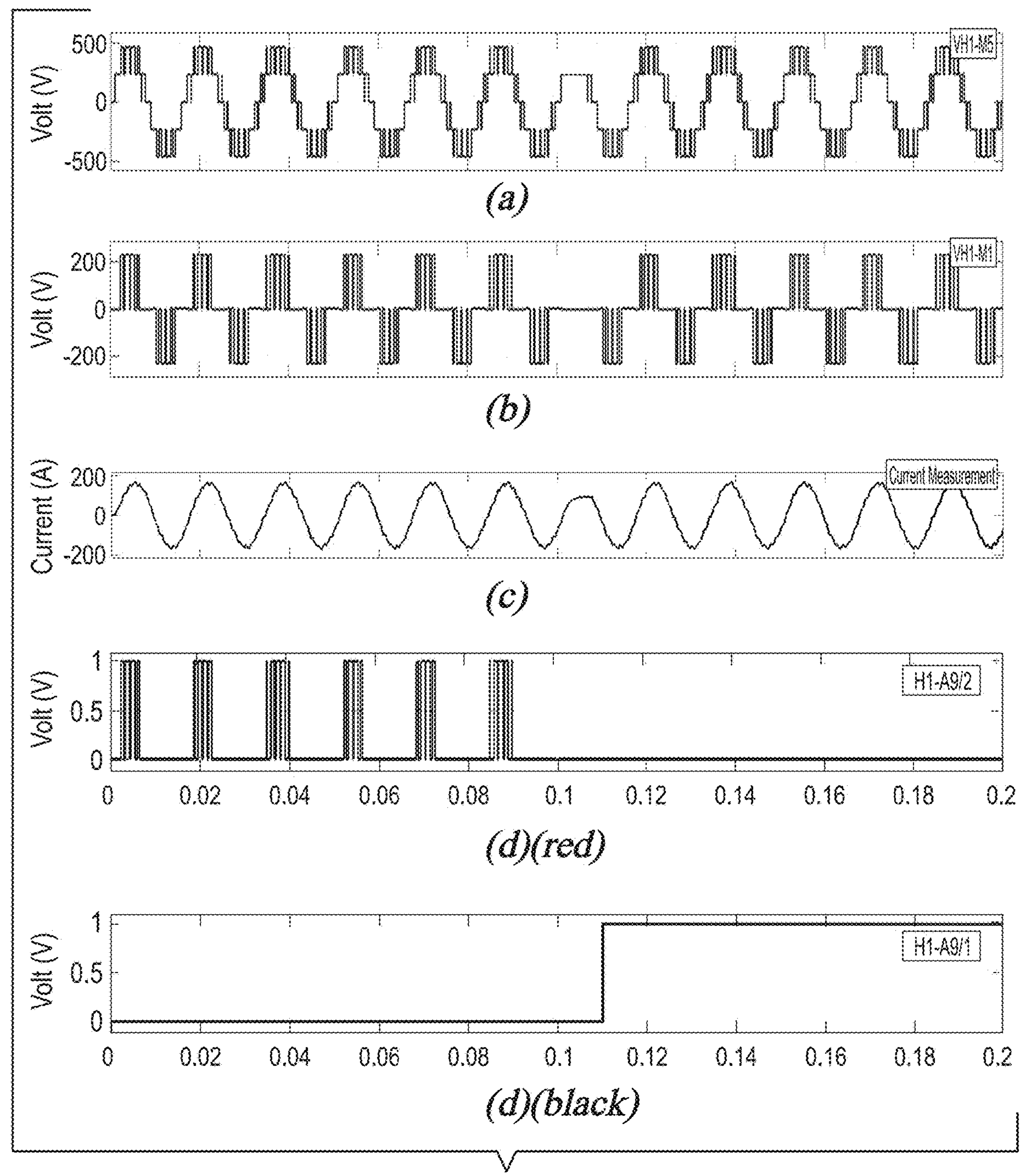
FIG. 13 shows the result of reconfiguration and an open circuit fault switch on $S_{11}$ at t=0.1 s with time delay for the control signal, (a) the output voltage; (b) output voltage of H1; (c) the output current; and (d) $S_{11}$ (red) and the fault detection signal (black).

To verify the proposed reconfiguration topology for CHB multilevel inverter, a detailed MATLAB/Simulink model was developed to examine the performance of the reconfiguration circuit. As a first example, an open circuit fault has been created for a five-level CHB multilevel inverter. The open circuit fault has been created in S11. The simulation includes using both the proposed open circuit fault detection method and the proposed reconfiguration circuit together. FIG. 13 shows the simulation result of reconfiguration and an open circuit fault switch on at t=0.1 s, (a) the output voltage; (b) output voltage of H1; (c) the output current; and (d) $S_{11}$ (red) and the fault detection signal (black). A delay time (0.01 s) has been used for the fault detection signal to make it easy for the reader to understand the transition between the fault detection, when the proposed detection method detects the fault occurrence, and the reconfiguration method. It is obvious that when the open circuit fault happens at time equal to 0.1 s, the output voltage and current have lost one level resulting in unbalancing output. However, the reconfiguration circuit ensures that the output voltage and current are the same as the normal values before the fault happening.

Figure 14:
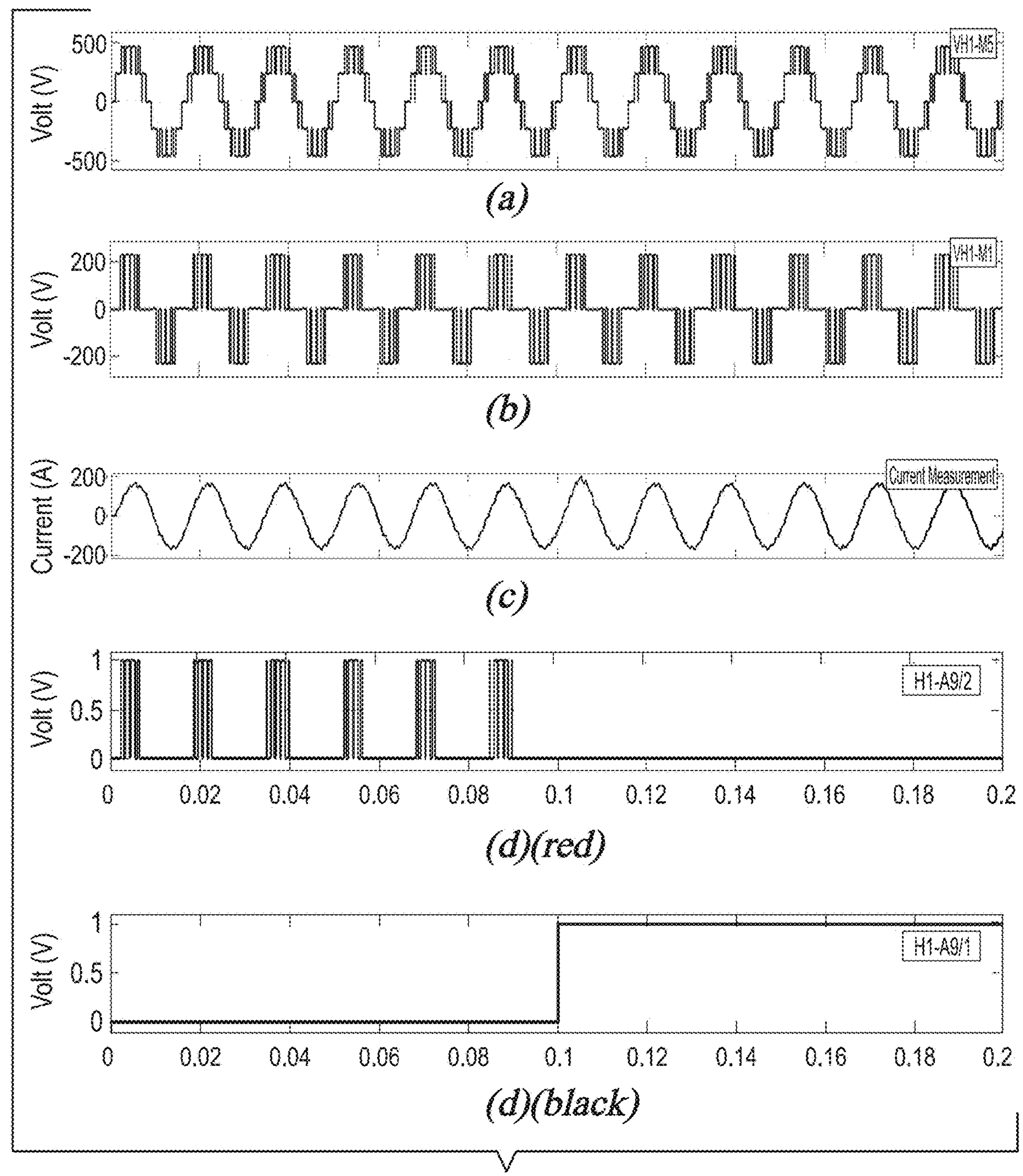
FIG. 14 shows the result of reconfiguration and an open circuit fault switch on $S_{11}$ at t=0.1 s, (a) the output voltage; (b) output voltage of H1; (c) the output current; and (d) $S_{11}$ (red) and the fault detection signal (black).

The actual respond for the reconfiguration circuit is shown in FIG. 14, which is without delay. It is worth mentioning that the reconfiguration circuit ensures the CHB inverter continues to generate the same output voltage and current after the fault occurrence. When the fault occurs in S11, T1 is closed and Sa1 will have the PWM signals as S11.

This invention relates to MMC topologies in a novel circuit to maintain these topologies during a faulted condition. A CHB multilevel inverter has been selected to descript this invention, but it can also be implemented for all the kinds of MMCs.

Reference numerals used throughout the detailed description and the drawings correspond to the following elements:

Isolated fault replacement path H bridge 100
First isolating switch T1
second isolating switch T2
upper fault path switch San
lower fault path switch Sbn From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A faulted switch isolated replacement circuit apparatus for a power converter including a first semiconductor connected between a first power input and a first power output, and a second semiconductor connected between the first power input and a second power output, the power converter further including a second power input and a third semiconductor electrically connected between the second power input and the first power output, comprising:

a first fault path electrically connected to the first power input, the first fault path including an isolated node; and
a first isolating switch electrically connected to the isolated node and the first power output;
a second isolating switch electrically connected to the isolated node and the second power output;
a second fault path electrically connected to the second power input, the second fault path including the isolated node.

2. The faulted switch isolated replacement circuit apparatus of claim 1, further comprising:

the second fault path including a third switch set and a fourth switch set electrically series connected between the second power input and the isolated node.

3. The faulted switch isolated replacement circuit apparatus of claim 2, further comprising:

the third switch set including a second path first switch electrically connected in parallel to a second path first direction diode; and
the fourth switch set including a second path fourth switch electrically connected in parallel to a second path second direction diode.

4. A faulted switch isolated replacement circuit apparatus for a power converter including a first semiconductor connected between a first power input and a first power output, and further including a second semiconductor connected between the first power input and a second power output, a second power input and a third semiconductor electrically connected between the second power input and the first power output, and a fourth semiconductor electrically connected between the second power input and the second power output, the faulted switch isolated replacement circuit apparatus comprising:

a first fault path electrically connected to the first power input, the first fault path including an isolated node;
a first isolating switch electrically connected to the isolated node and the first power output;
a second fault path electrically connected to the second power input, the second fault path including the isolated node; and a second isolating switch electrically connected to the isolated node and the second power output.

5. A faulted switch isolated replacement circuit apparatus for a power converter including a first semiconductor connected between a first power input and a first power output, and a second semiconductor connected between a second power input and the first power output, the faulted switch isolated replacement circuit apparatus comprising:

a first fault path electrically connected to the first power input, the first fault path including an isolated node;

a first isolating switch electrically connected to the isolated node and the first power output; and a second fault path electrically connected to the second power input, the second fault path including the isolated node.

6. A faulted switch isolated replacement circuit apparatus for a power converter including a first semiconductor connected between a first power input and a first power output, and a second semiconductor connected between a second power input and a second power output, the faulted switch isolated replacement circuit apparatus comprising:

a first fault path electrically connected to the first power input, the first fault path including an isolated node;

a first isolating switch electrically connected to the isolated node and the first power output;

a second fault path electrically connected to the second power input, the second fault path including the isolated node; and a second isolating switch electrically connected to the isolated node and the second power output.

* * * * *